United States Patent [19]

Stevens

[11] 4,161,963
[45] Jul. 24, 1979

[54] LIQUID TREATMENT APPARATUS

[75] Inventor: Walter J. Stevens, Belvidere, Ill.

[73] Assignee: Techni-Chem, Inc., Cherry Valley, Ill.

[21] Appl. No.: 615,718

[22] Filed: Sep. 22, 1975

[51] Int. Cl.² ............................................. E03B 11/00
[52] U.S. Cl. .................................... 137/592; 210/289; 210/291; 422/274; 422/279; 422/902
[58] Field of Search .............. 210/277, 289, 291, 293; 23/271, 272 R, 272 AH; 137/592; 422/279, 274, 278, 902

[56] References Cited

U.S. PATENT DOCUMENTS

| | | | |
|---|---|---|---|
| 425,573 | 4/1890 | Jewell | 210/279 |
| 607,155 | 7/1898 | Bleakly | 210/279 |
| 667,005 | 1/1901 | Davis | 210/293 |
| 727,230 | 5/1903 | Underwood | 210/293 |
| 1,196,058 | 5/1916 | Widner | 210/289 |
| 1,873,594 | 8/1932 | Johnson | 210/289 |
| 2,364,775 | 12/1944 | Brice | 210/291 |
| 2,773,012 | 12/1956 | Penick et al. | 210/289 |
| 3,035,702 | 5/1962 | Marvin | 210/291 |
| 3,049,238 | 8/1962 | Whitlock | 210/279 |
| 3,240,699 | 3/1966 | Duff | 210/279 |
| 3,244,197 | 4/1966 | Stilwell | 210/279 |
| 3,384,240 | 5/1968 | Berardi | 210/279 |
| 3,391,707 | 7/1968 | Riley | 210/289 |
| 3,451,554 | 6/1969 | Wade | 210/279 |
| 3,532,216 | 10/1970 | Zievers | 210/289 |
| 3,552,569 | 8/1971 | Zievers | 210/279 |
| 3,556,299 | 1/1971 | Zievers | 210/279 |
| 3,717,254 | 2/1972 | Benecke | 210/279 |
| 3,747,768 | 7/1973 | Barrera | 210/289 |

FOREIGN PATENT DOCUMENTS

| | | | |
|---|---|---|---|
| 86741 | 6/1936 | Sweden | 210/291 |
| 19006 | of 1889 | United Kingdom | 210/291 |
| 21120 | of 1914 | United Kingdom | 210/291 |

Primary Examiner—Charles N. Hart
Assistant Examiner—Ernest G. Therkorn
Attorney, Agent, or Firm—Morsbach & Pillote

[57] ABSTRACT

An ion exchange liquid treatment apparatus including a tank having an upwardly dished bottom wall and a distributor of the type having a central header and a plurality of distributor conduits extending outwardly from this header. Each distributor conduit is formed of a first straight conduit section that extends generally radially outwardly from the header and a second straight conduit section that is connected to the first conduit section by a pipe elbow whereby the second conduit section can be positioned oblique to a plane through the longitudinal axis of the tank and at a shallow angle to a plane perpendicular to the tank axis to generally conform to the contour of the dished bottom wall of the tank. Each of the second distributor conduit sections preferably have lateral conduits extending transverse thereto to achieve generally uniform liquid flow throughout the cross-section of the tank. The distributor conduits are supported on the tank bottom by a distributor support structure including radially extending arms and annular ring members interconnected to form a generally frusto-conical grid that underlies and supports the distributor conduits.

6 Claims, 4 Drawing Figures

U.S. Patent  Jul. 24, 1979  Sheet 2 of 2  4,161,963
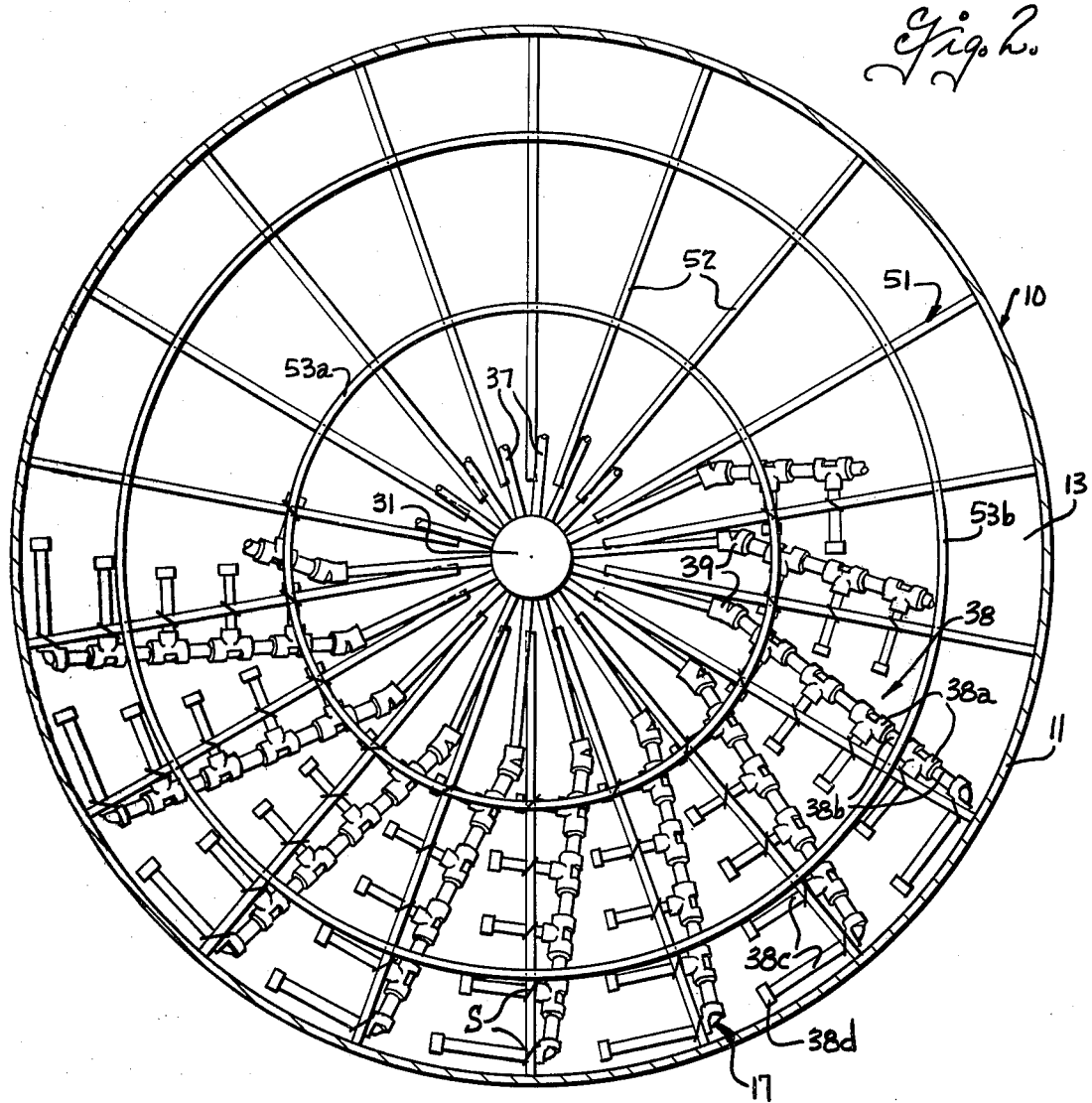
Fig. 2.
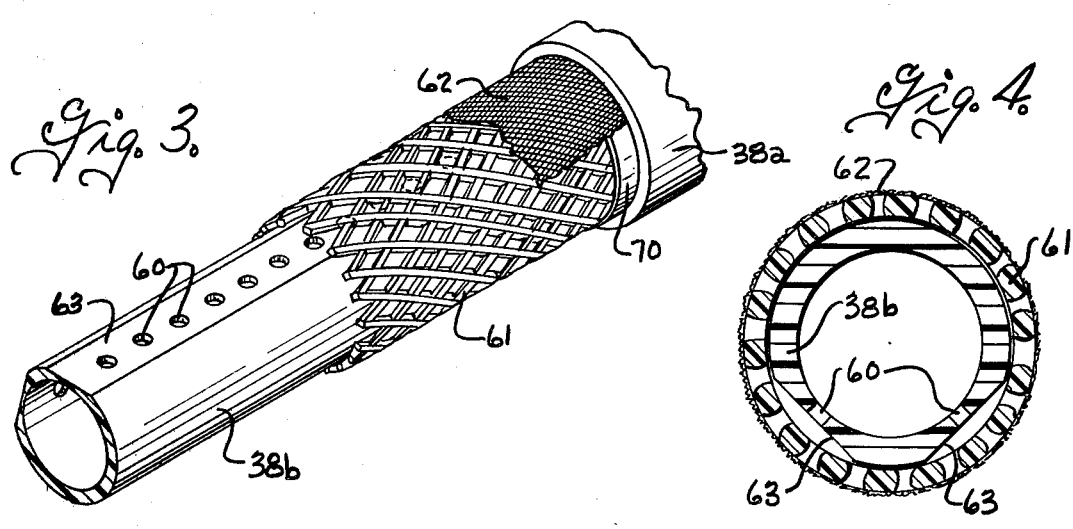
Fig. 3.
Fig. 4.

LIQUID TREATMENT APPARATUS

BACKGROUND OF THE INVENTION

Ion exchange type liquid treatment apparatus commonly utilize liquid distributors to provide more uniform flows of the liquid to be treated and of the regenerating and rinse fluids through the bed of exchange material in the tank. It is desirable in such treatment apparatus to locate the lower distributor closely adjacent the bottom of the treatment tank in order to minimize the volume of the exchange resin below the distributor that is not fully contacted by the liquid to be treated or by the regeneration and rinse fluids. However, such treatment tanks are commonly formed with a dished bottom wall and this complicates the problem of locating the distributor assembly closely adjacent the bottom.

It has heretofore been proposed, for example as shown in U.S. Pat. No. 2,364,775, to bend or otherwise form the several generally radial distributor conduits with a longitudinal curve to more clearly conform to the curvature of the bottom. However, this necessitates separate bending or forming of each of the distributor conduits and markedly increases the overall cost of making the distributor. Moreover, the curvature of the bottom walls is different for tanks of different size and this would require forming distributor conduits with different curvature. Further, longitudinally curved distributor conduits cannot be turned about their axes to thread the distributor conduits in the header when the distributor is mounted closely adjacent the tank bottom and, when longitudinally curved distributor conduits are used, it is either necessary to provide a special header which allows installation and removal of the curved distributor conduits without turning of the conduits, for example as shown in the aforesaid U.S. Pat. No. 2,364,775, or to raise or even remove the entire distributor from the tank to provide clearance for turning the curved conduits.

It is an object of the present invention to overcome the disadvantages of the prior art by providing a liquid treatment apparatus having an improved distributor construction which can be generally conformed to the dished bottom in a treatment tank to extend closely adjacent thereto and which utilizes straight pipe sections and standard pipe fittings.

Another object of this invention is to provide an improved distributor construction and suport therefor which supports the distributor on the dished bottom of the treatment tank in closely spaced relation thereto.

Still another object of the invention is to provide a distributor for a treatment tank in which the various components used in making the distributor can be easily assembled inside the tank.

Accordingly, the present invention provides a liquid treatment apparatus, including a tank having an upwardly dished bottom wall, a lower liquid distributor having a header mounted centrally in opening in the bottom wall and distributor conduits connected to the header and extending outwardly therefrom at angularly spaced locations around the header and wherein the distributor conduits each include a first straight conduit section extending generally radially outwardly from the header and a second straight conduit section connected to the outer end of the first conduit section by a pipe elbow, the pipe elbow on each distributor conduit extending oblique to the longitudinal plane defined by the respective first conduit section and the tank axis and such that each second conduit section extends at an acute angle to the longitudinal plane through the respective first pipe section and also at an acute angle to a plane perpendicular to the tank axis to provide a liquid distributor having a shallow upwardly dished configuration that generally conforms to the dished configuration of the bottom wall of the tank.

The invention also advantageously provides an improved distributor support including radially extending arms that are supported on the dished bottom wall of the tank to extend at a shallow angle thereto and with ring members interconnecting the arms for supporting the distributor conduits.

These, together with other objects, features and advantages of the present invention will become apparent from the following description when taken in connection with the accompanying drawings wherein:

FIG. 2 is a horizontal sectional view through the treatment tank taken on the plane 2—2 of FIG. 1;

FIG. 3 is a fragmentary perspective view of a distributor conduit section with parts broken away to illustrate details of the construction; and FIG. 4 is a transverse sectional view to one of the distributor conduit sections.

Figure 1:
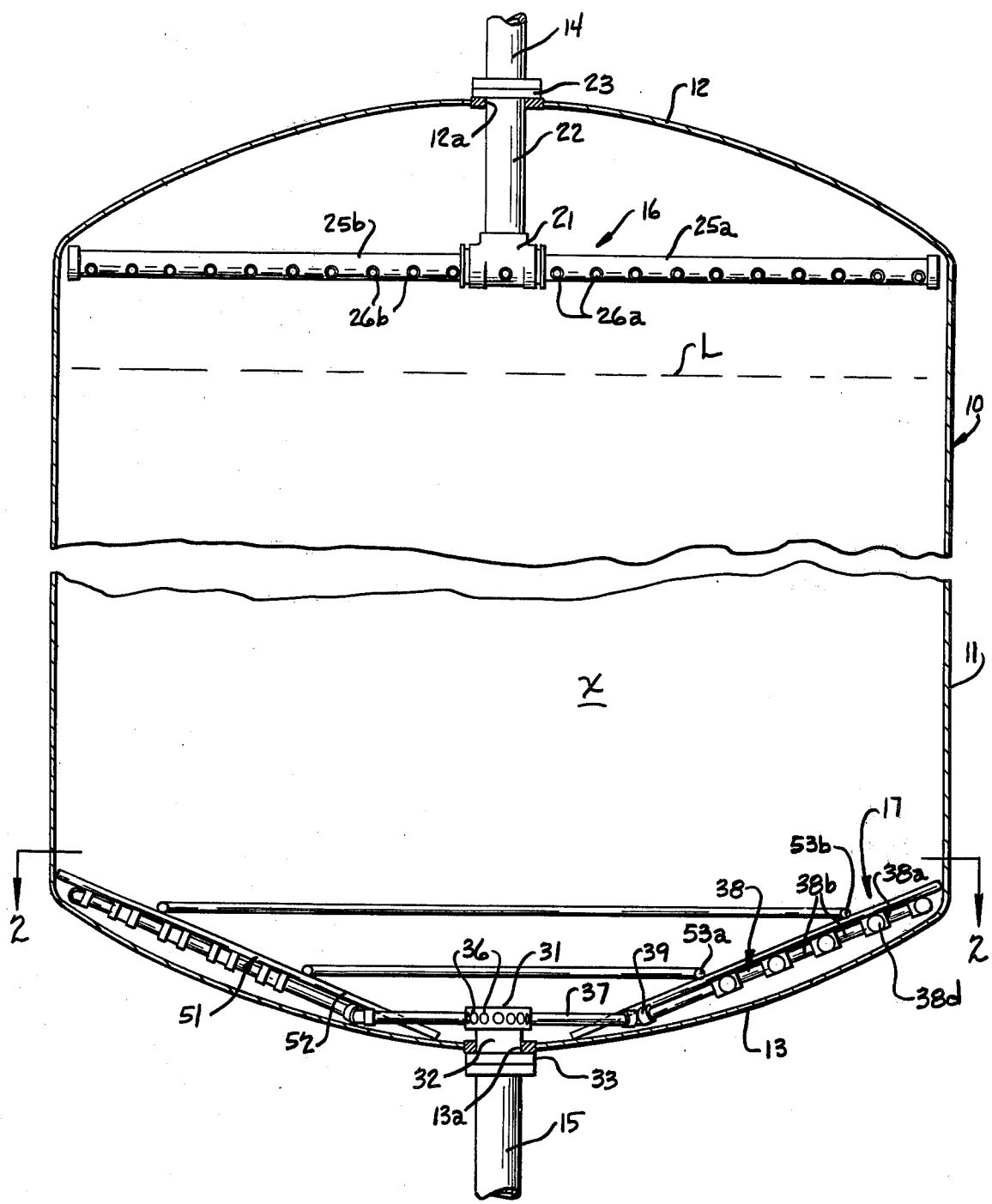
FIG. 1 is a fragmentary sectional view through the treatment tank of an ion exchange type liquid treatment apparatus embodying the present invention.

Referring now more specifically to the accompanying drawings there is illustrated the liquid treatment apparatus including a tank 10 which is filled to a preselected level L with an ion exchange resin X. The tanks generally include a generally cylindrical sidewall 11 and dished top and bottom walls 12 and 13. Top and bottom liquid delivery conduits 14 and 15 are connected to the tank to pass the liquid to be treated as well as the regenerating and rinse liquids to and from the tank. In order to more uniformly distribute the flow of liquid through the bed of exchange material, upper and lower liquid distributors 16 and 17 are provided in the tanks and connected to the respective top and bottom of the delivery conduits 14 and 15. The upper liquid distributor 16 is located above the upper liquid level L of the ion exchange resin and the upper liquid distributor need not conform to the curvature of the dished top wall but can be spaced a substantial distance therebelow. In the embodiment shown, the upper liquid distributor includes a T-fitting 21 mounted on the lower end of an upright conduit 22. This conduit 22 extends through an opening 12a in the top of the tank and flange 23 is provided on the upper end of the conduit 22 and is sealed to the tank top and to the flanged end of the upper delivery conduit 14 by suitable gaskets and clamp bolts (not shown). Manifold conduits 25a and 25b are connected to the T-fitting 21 and extend in relative opposite directions therefrom and have laterals 26a and 26b extending from opposite sides thereof at spaced locations therealong. Preferably, the laterals 26a and 26b are formed with the length to extend into proximity to the periphery of the sidewall 11 of the tank so that the length of the laterals 26a and 26b decreases in a direction toward the outer ends of the manifolds 25a and 25b respectively. Openings 27a are formed at spaced locations along the laterals 26a and 26b and are preferably located at the upper side of the laterals and, as is well understood in the art, the openings are sized in relation to the desired flow rate to generally uniformly distribute the flows of liquid throughout the cross-section of the tank.

The ion exchange resin X rests on the dished bottom wall of the tank and it is desirable to have the lower distributor extend closely adjacent the bottom wall of the tank to minimize the volume of resin that is below the distributor and which is not uniformly contacted by the liquid to be treated and by the generating and rinse fluids. The lower distributor 17 is accordingly arranged so as to generally conform to the dished contour of the bottom wall 13.

The lower distributor in general includes a central header 31 having a lower conduit section 32 extending through a reinforced bottom opening 13a in the bottom wall 13. A flange 33 is provided on the lower end of the conduit 32 and is secured and sealed to the bottom wall 13 and to the flange on the lower delivery conduit by suitable gaskets and bolts (not shown). The header 31 has a plurality of openings 36 at generally uniform angularly spaced locations therearound and, in the embodiment shown, has eighteen such openings at locations angularly spaced 20° on center it being understood that the number of header openings and distributor conduits can be changed for tanks of different size. The openings 36 have their axes disposed generally horizontally and extend generally radially from the header. A plurality of first or inner conduit sections 37 are threaded in the openings 36 and extend generally radially outwardly from the header a preselected distance, for example of the order of one-fifth or one-quarter of the radial extent of the tank, and a second or outer conduit section 38 is connected by elbow 39 to the outer end of each of the first conduit sections 37. The pipe elbows are standard pipe fittings having an angle of substantially less than 90° and are preferably 45° elbows, but can be 22½° elbows for very large tanks having tank bottoms with a large radius of curvature. The pipe elbows are threadedly connected to the inner and outer conduit sections and can be turned about the axis of the respective inner conduit section 37 to position the axis of their outlet ends in a plane oblique to a longitudinal plane that extends through the axis of the respective first conduit section and the tank axis. Thus, the outer conduit sections can be positioned to extend oblique to the longitudinal plane through the inner conduit section as shown in FIG. 2 and at an acute angle substantially less than 45° to a plane perpendicular to the tank axis as shown in FIG. 1. In the embodiment illustrated, the second conduit sections are disposed at an angle of about 22° to a plane perpendicular to the tank axis, it being understood that the angle could be more or less than that amount, depending on the curvature of the bottom wall of the tank. The distributor conduit sections 37 and 38 thus form a distributor assembly having a shallow upwardly dished configuration. Moreover, it will be seen that the dished configuration of the lower distributor can be readily changed by turning the couplings 39 relative to the inner conduit sections to change the angle between the outer conduit sections in a plane perpendicular to the tank axis. In addition, the dished configuration can also be changed by changing the relative lengths of the first and second conduit sections 37 and 38 and, if desired, still another conduit section can be connected to the outer end of the second conduit section 38 through a further pipe elbow, if desired to compound the curvature of the lower distributor.

At least the second conduit sections 38 of the lower distributor are provided with laterals to more evenly distribute the flow of liquid in the area between adjacent distributor conduits. In the embodiment shown, the second distributor conduit sections 38 of each distributor conduit has a plurality of T-fittings 38a spaced therealong and interconnected by pipe nipples 38b to form the aforementioned second pipe section 38. The T-fittings 38a are threadedly connected to the nipples 38b and laterals 38c are threadedly attached to each of the T-fittings. The laterals are preferably formed of variable lengths from the inner to the outer end of the pipe secton 38 as best shown in FIG. 2, to extend into proximity to the next adjacent distributor conduit. Caps 38d are provided at the outer ends of the laterals to close the same.

The lower distributor is supported on the bottom wall by a distributor support rack 51. In the preferred embodiment illustrated, the rack 51 includes a plurality of arms 52 advantageously corresponding in number to the number of distributor conduits in the lower distributor, and ring members 53a and 53b that are attached to and extend between the arms to interconnect the same. As best shown in FIG. 1, the rack 51 rests on the bottom wall and the arms 52 extend from a point outwardly of the opening 13a in the bottom wall to a point adjacent the periphery of the tank and the arms 52 extend in generally chordal fashion to the curvature in a radial plane of the dished bottom wall 13 so that the arms are disposed at a shallow angle to a plane perpendicular to the tank axis. The rings 53a and 53b have a progressively increasing diameter and, in conjunction with the arms 51, define a generally frusto-conical grid concentric with the tank axis and disposed at the aforementioned shallow angle to a plane perpendicular to the tank axis. At least some of the rings herein shown as rings 53a and 53b are radially located to cross and support the outer conduit sections 38 at locations intermediate their ends and the arms 52 are advantageously arranged to cross and support the laterals 38d on the outer conduit sections 38, as best shown in FIG. 2. U-bolts or straps S can be provided for securing the outer conduit sections to the distributor suppport rack at locations where the conduit sections and laterals cross the arms and ring members of the distributor support rack.

The tank 10 used in the liquid treatment apparatus are frequently of relatively large size, and may, for example, be 10 to 15 feet or more in diameter. The distributors for such tanks are relatively large in size and it is desirable to be able to assemble the component parts to the distributor in the tank. The present distributor construction markedly facilitates such assembly. The elbow couplings 39 and the outer distributor conduit sections 38 can be turned about the axis of the inner conduit sections 37 to position the outer conduit sections at an angle of 45° to the tank axis. This enables assembly of the T-fittings 38a and the pipe nipples 38b to form the second conduit sections, and the further assembly of the laterals 38c and caps 38d on the T-fittings, when spaced a substantial distance above the tank bottom and with the laterals extending in a plane transverse to the tank bottom. The second conduit section can thereafter be swung back to a position to extend alongside the distributor support rack. Moreover, it will be seen that the coupling 39 allows significant variation in the angular relationship between the first and second conduit sections so that the second conduit sections can be angularly positioned to conform to the rack to be suppported thereby.

The conduit sections of the lower distributor are also formed with openings 60 at spaced locations therealong to distribute the flows of liquid generally uniformly throughout the cross-section of the tank. The openings are preferably formed at spaced locations along the underside of the inner conduit sections 37, and along the underside of the pipe nipples 38a that form the outer conduit section 38, as well as along the underside of the laterals 38c on the outer conduit sections. In order to inhibit the entrance of resin into the openings in the lower distibutor, the several pipes such as 38a and 38c in the lower distributor are preferably enclosed in a tubular coarse mesh grid 61 that is, in turn, enclosed in a fine mesh screen 62. The conduit sections are preferably formed with longitudinally extending flat areas or recesses 63 that extend along the pipe sections and intersect the openings therein to space the outer ends of the openings from the coarse mesh grid 61. In order to facilitate attaching the ends of outer screens to the conduit sections, collars 70 are provided at the ends of each pipe section to provide an annular shoulder having an outer diameter generally corresponding to the outer diameter of the coarse mesh grid 61. The ends of the outer screen can be attached by tying or banding to the collars.

From the foregoing it is felt that the construction and use of the apparatus will be readily understood. The first and second conduit sections 37 and 38 of the distributor conduits extend outwardly from the header 31 and the angular relationship between the first and second conduit sections can be adjusted by turning the couplings 39 relative to the respective first conduit section so as to cause the outer conduit sections to extend at a shallow angle to a plane perpendicular to the tank axis and rest directly on the distributor support rack. The distributor support rack includes ring members that underlie and support the second conduit sections and radially extending arm members that underlie and support the laterals on the second conduit sections. The lower distributor can thus be economically formed of straight pipe sections and conventional pipe fittings and can be easily assembled in the tank and arranged to conform to the curvature of the dished bottom of the tank.

While a preferred embodiment of the invention is herein illustrated and described, it will be understood that various changes and modifications may be made by those skilled in the art without departing from the spirit of the invention and fall within the scope of the following claims.

The embodiments of the invention in which an exclusive property or privilege is claimed are defined as follows:

1. In a liquid treatment apparatus including a tank having a side wall and an upwardly dished bottom wall and a central opening in the bottom wall, a lower liquid distributor having a header mounted in said central opening in the bottom wall and a plurality of distributor conduits connected to the header and extending outwardly therefrom at generally uniform angularly spaced locations around the header, the improvement wherein said distributor conduits each include a first straight conduit section extending laterally outwardly from the header toward the side wall of the tank and a second straight conduit section connected to the outer end of the first conduit section by a pipe elbow having a fixed angle of substantially less than 90°, the pipe elbow in each distributor conduit extending oblique to a longitudinal plane defined by the axis of the respective first conduit section and the tank axis, and each second conduit section extending at an acute angle to the longitudinal plane through the respective first conduit section and at an acute angle to a plane perpendicular to the tank axis to provide a liquid distributor having a shallow upwardly dished configuration, and distributor support means for supporting the distributor on the tank bottom, said distributor support means including a plurality of arms corresponding in number to the number of distributor conduits and supported on said bottom wall to extend outwardly from adjacent the center of the tank at an acute angle to a plane perpendicular to the tank axis, and at least one ring member generally concentric with the tank axis and attached to said second conduit sections of the distributor conduits to support the same.

2. In a liquid treatment apparatus including a tank having a side wall and an upwardly dished bottom wall and a central opening in the bottom wall, a lower liquid distributor having a header mounted in said central opening in the bottom wall and a plurality of distributor conduits connected to the header and extending outwardly therefrom at generally uniform angularly spaced locations around the header, the improvement wherein said distributor conduits each include a first straight conduit section extending laterally outwardly from the header toward the side wall of the tank and a second straight conduit section connected to the outer end of the first conduit section by a pipe elbow having a fixed angle of substantially less than 90°, the pipe elbow in each distributor conduit extending oblique to a longitudinal plane defined by the axis of the respective first conduit section and the tank axis, and each second conduit section extending at an acute angle to the longitudinal plane through the respective first conduit section and at an acute angle to a plane perpendicular to the tank axis to provide a liquid distributor having a shallow upwardly dished configuration, and distributor support means for supporting the distributor on the tank bottom, said second conduit sections each having a plurality of T-fittings at spaced locations therealong and lateral conduit sections attached to each of said T-fittings and extending generally horizontally, said distributor support means including a plurality of arms corresponding in number to the number of distributor conduits and supported on said bottom wall to extend outwardly from adjacent the center of the tank at an acute angle to a plane perpendicular to the tank axis and crosswise of at least some of said lateral conduit sections, and means attaching the arms to at least some of said lateral conduit sections to suppport the same.

3. In a liquid treatment apparatus including a tank having a side wall and an upwardly dished bottom wall and a central opening in the bottom wall, a lower liquid distributor having a header mounted in said central opening in the bottom wall, and a plurality of distributor conduits connected to the header and extending outwardly therefrom at generally uniform angularly spaced locations around the header, the improvement comprising a distributor support resting on said bottom wall and defining a generally frusto-conical open grid having its minor end spaced outwardly from the header and extending outwardly and upwardly from its minor end at a preset acute angle to a plane perpendicular to the axis of the tank, said distributor conduits each including a first straight conduit section extending laterally outwardly from the header toward the side wall and a second straight conduit section connected to the outer end of the first conduit section by a pipe elbow having a fixed angle greater than said preset acute angle and less than 90°, the pipe elbow in each distributor conduit extending oblique to a longitudinal plane defined by the axis of the respective first conduit section and the tank axis, and each second conduit section extending at an acute angle to the longitudinal plane through the respective first conduit section and at said preset acute angle to a plane perpendicular to the tank axis to extend alongside said frusto-conical grid and provide a liquid distributor having a shallow upwardly dished configuration, and means attaching said second conduit sections to said grid for support thereby.

4. A liquid treatment apparatus according to claim 3 wherein said distributor support includes several rings of different diameter underlying said second conduit sections of the distributor at spaced locations therealong.

5. A liquid treatment apparatus according to claim 3 wherein distributor support includes a plurality of straight arms corresponding in number to the number of distributor conduits and supported on said bottom wall to extend outwardly from adjacent the center of the tank at said preset angle, and ring members attached to said arms and attached said second conduit sections of the distributor conduits.

6. A liquid treatment apparatus according to claim 3 wherein said second conduit sections each have a plurality of T-fittings at spaced locations therealong and lateral conduit sections attached to each of said T-fittings and extending generally horizontally, said distributor support including a plurality of arms corresponding in number to the number of distributor conduits and supported on the bottom wall to extend outwardly from adjacent the center of the tank at said preset acute angle to a plane perpendicular to the tank axis and crosswise of at least some of said lateral conduit sections, and means attaching the arms to at least some of the lateral conduit sections to support the same.

* * * * *